6765X
J. Eastman,
Water Wheel.
Patented Sep. 28, 1831.
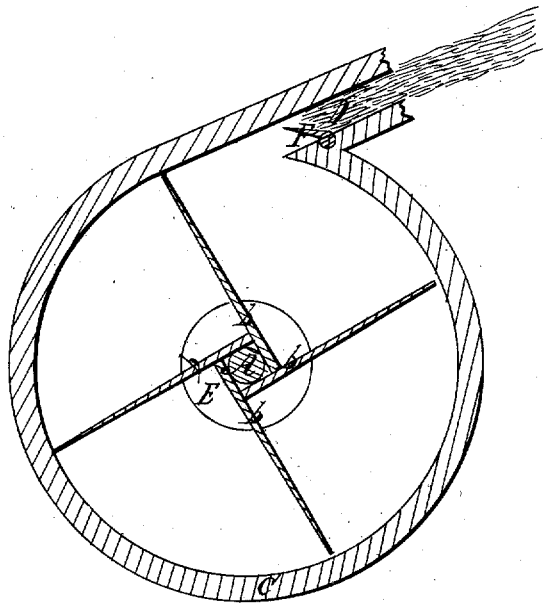
N. PETERS, PHOTO-LITHOGRAPHER, WASHINGTON, D. C.

Joel Eastman. Bath N Hampshire

Letters Patent

The Schedule referred to in these Letters Patent and making part of the same containing a description in the words of the said Joel Eastman himself of his improvement in the Water Wheel and the application of Water thereunto To all whom it may concern
BE it Known that I Joel Eastman of Bath in the County of Grafton and State of New Hampshire have invented a new and useful improvement in the construction of the Water Wheel and the application of Water thereunto and that the following is a correct description thereof
To a vertical or horizontal shaft I attach two or more floats made of wood or iron their proper proportion being about two feet long and one foot wide making a wheel four feet in diameter and one foot long. This wheel is inclosed in a tight curve or case fitting the Wheel closely and making part of the close trunk or Penstock extending from the flume into the dead water at the Bottom of the fall. Should the necessary power and motion require it two or more wheels may be attached to the same shaft each Wheel having its own water conveyed to and from it separate from the others. For a vertical shaft there should be a Penstock or close trunk extending as high as the opening for the escape of water from the upper wheel and into the water at the bottom of the fall into which Penstock the water passes through an opening from each Wheel. each opening being not less than five times as large as that by which the water is admitted to the wheels For a horizontal shaft there should be an opening at each end of each Wheel for the escape of water. A. in the accom

9/28/1831 6765X panying Drawing represents a shaft b.b.b.b. the floats C the case or curb one side of which is omitted for the purpose of more clearly explaining the structure. D the aperture through which the water is admitted to the wheel E a circular opening round the shaft through the side of the case for the escape of the water from the wheel F. a Gate or valve. — What I claim as my invention is a water Wheel (which) constructed in the manner above described being enclosed in a case, the case being connected with and forming part of a tight penstock or flume extending the whole height of the fall. And the application of water to the wheel in the manner above explained. however the same may be varied in practice Witnesses,
Eben Carleton Junr
Charles Abbott Joel Eastman Recd.
W.G.

[illegible]